June 25, 1929.　　J. W. BRUNDAGE　　1,718,631
TIRE VULCANIZING MOLD
Filed Jan. 31, 1928　　3 Sheets-Sheet 1
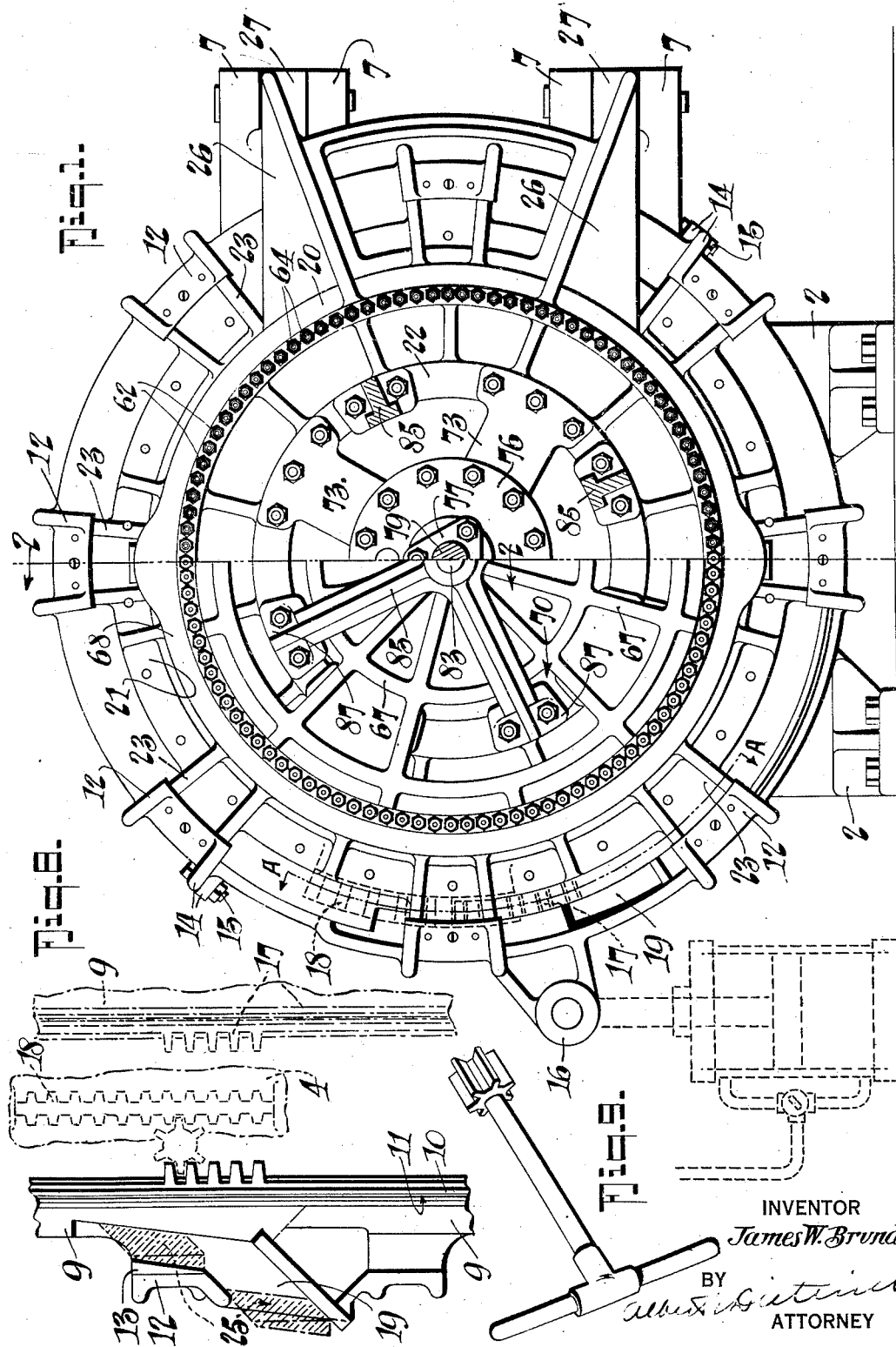
INVENTOR
James W. Brundage
BY
ATTORNEY

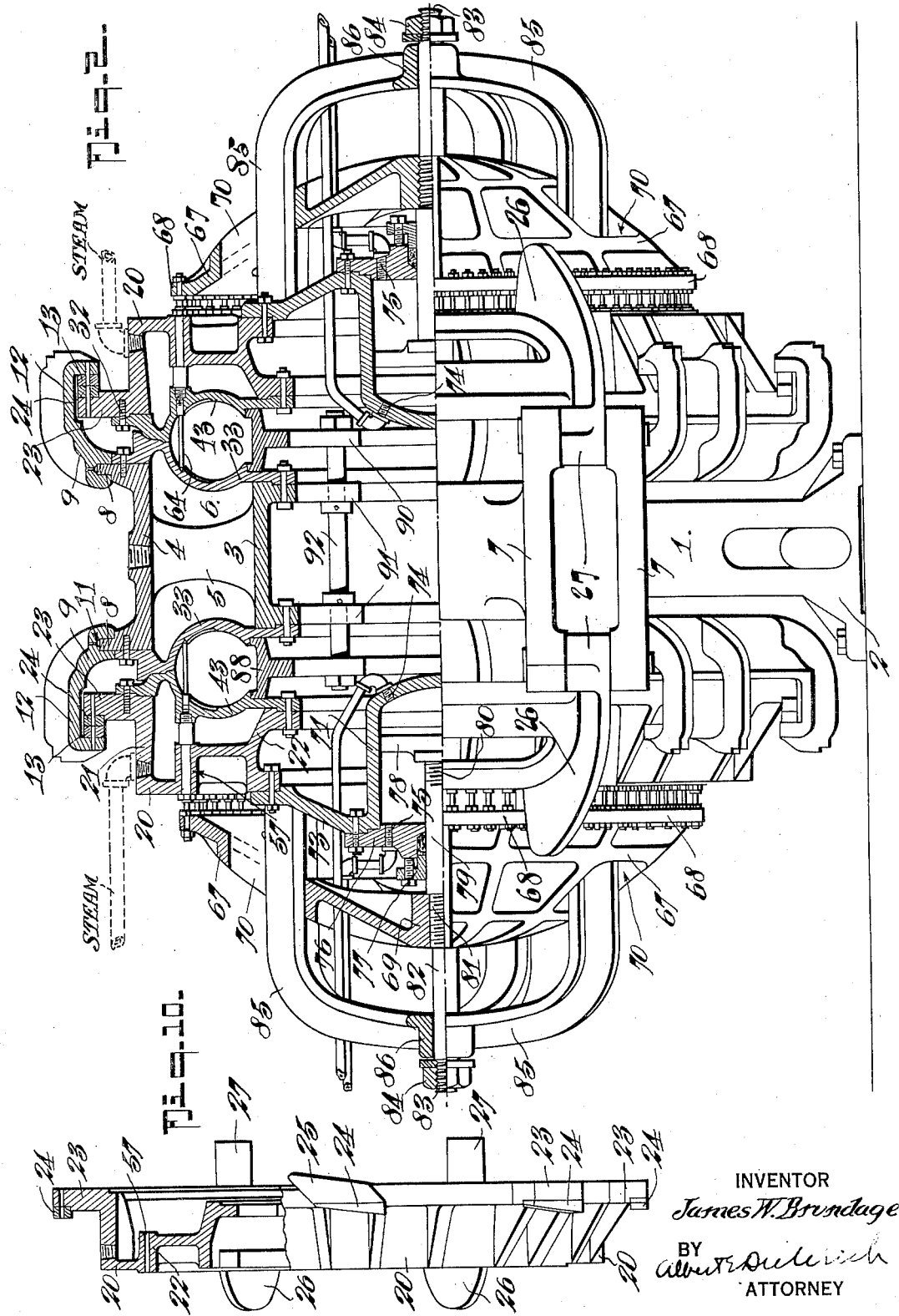

June 25, 1929. J. W. BRUNDAGE 1,718,631
TIRE VULCANIZING MOLD
Filed Jan. 31, 1928 3 Sheets-Sheet 3
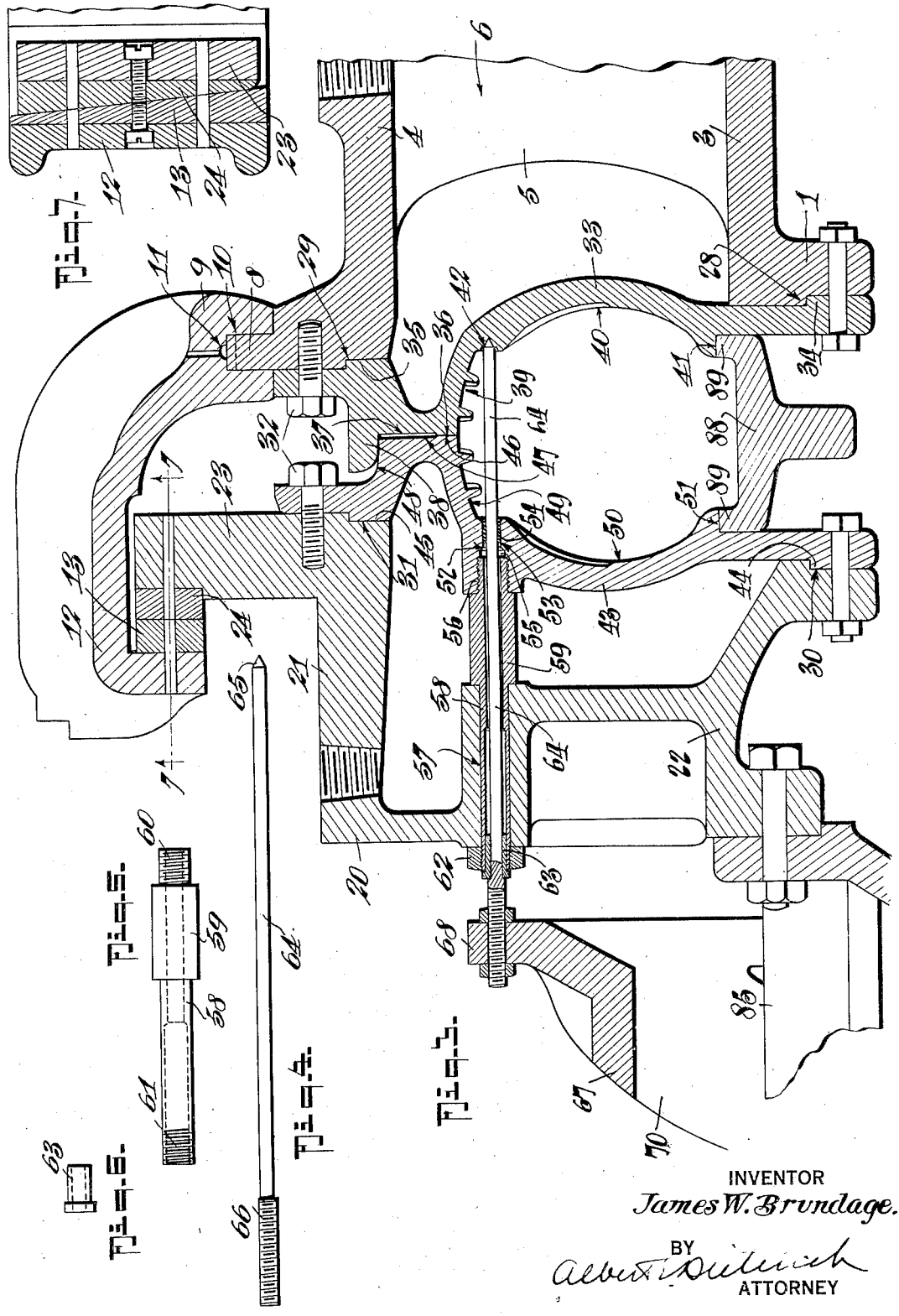
INVENTOR
James W. Brundage.
BY
ATTORNEY Patented June 25, 1929.

1,718,631

UNITED STATES PATENT OFFICE.

JAMES W. BRUNDAGE, OF AKRON, OHIO, ASSIGNOR TO LAMBERT TIRE & RUBBER CO., OF AKRON, OHIO, A CORPORATION OF ARIZONA.

TIRE-VULCANIZING MOLD.

Application filed January 31, 1928. Serial No. 250,870.

My invention relates to the art of manufacturing tires and especially to that branch of the art dealing with the manufacture of pneumatic tires having unusually thick treads.

An object of the present invention is to provide a mold composed of a relatively stationary part and a relatively movable part, between which parts the tire to be vulcanized is enclosed, one of the parts of the mold carrying core pins which, after the mold is closed, are arranged to be forced into and transversely through the tread rubber stock to provide holes therein; the pins being advanced and withdrawn in unison by a piston and cylinder arrangement directly acting on the pin carrying spider.

Further objects of the invention are to render more practical vulcanizing molds embodying the pin features than those heretofore proposed; to provide a means for mounting the pins which will prevent pin-warping and which will permit convenient and ready replacement of parts when and if necessary; to provide for the reduction to the minimum of friction between moving parts.

Again it is an object of the invention to provide a heater of the watch-case type having removable mold-walls proper, one half section of which is removably mounted in the stationary part of the heater and the other half section is removably mounted in the movable wall or door of the heater, the outer wall of the door section and mold-wall half carried thereby being secured together by a set of pin guides as well as by bolting the parts together, in which pin guides the tread hole producing pins have sliding fits, a suitable cylinder and piston arrangement with piston rod being mounted on the door section and connected with a bell-like spider to whose annulus the hole-forming pins are fastened, a suitable guide bracket with a bearing for the piston rod being also secured to the door.

Other objects will in part be obvious and in part be referred to hereinafter.

To the attainment of the aforesaid objects and ends, my invention consists in the novel details of construction and in the combination, connection and arrangement of parts, hereinafter more fully described and then pointed out in the claims.

In the drawings:

Figure 1 is a side elevation and part section of a watch-case type heater with my invention applied.

Figure 2 is an end elevation of the same and part central vertical cross section on the line 2—2 of Figure 1.

Figure 3 is an enlarged detail section of a portion of the apparatus showing a pin sleeve in longitudinal section.

Figures 4, 5 and 6 are side elevations illustrating one each of the puncturing pins, the guide sleeves and the sleeve bushings respectively.

Figure 7 is a cross section taken on the line 7—7 on Figure 3.

Figure 8 is an inside elevation of a portion of the clamp ring in the area indicated by the line A—A on Figure 1, the relative positions of the other clamp ring and the rack portion of the stationary section, and also the entering and the clamped positions of the main wedge of the door being shown in dot and dash lines.

Figure 9 is a detail perspective view of a tool that may be used to engage the rack portions.

Figure 10 is an edge view and part section of one mold door.

In the drawings, in which like numerals of reference indicate like parts in all the figures, 1 represents the stationary section of the heater. In watch-case heaters it is common practice to provide a stationary section of dual construction with a door section on each side so that two tires may be cured at once. Since the structures at each side of the mid-plane of the stationary section are alike, for convenience of illustration only one-half of the stationary section is described in detail, it being understood that the structure on the side illustrated in detail is duplicated on the other side.

The stationary frame section 1 includes a base 2 through the medium of which the heater is bolted down to the floor or other suitable supporting bed. The stationary section 1 comprises an inner annular wall 3 and an outer annular wall 4 united by suitable connecting webs 5 and provided between these walls 3 and 4 is a steam chamber 6 into which steam is admitted through suitable openings to heat the mold walls to the desired temperature. The stationary frame section is provided with hinged lugs 7 to which the door section is hinged in a manner presently to be explained.

A clamp ring track flange 8 is provided on the stationary section 1 of the heater on which the clamp ring 9 is fitted, the ring 9 having rotational movement around the axis of the heater for a purpose presently understood. In order to apply the clamp ring to the flange 8 the ring is made in a plurality of sections which are bolted together by bolts 15 passing through abutting flanges 14.

The clamp ring 9 has a groove 10 to receive the track flange 8 and it also has an oil groove 11 for lubrication purposes. Projecting laterally the ring 9 has a plurality of hooks 12 whose operating faces are provided with replaceable wedges 13, the purpose of which will presently be made clear. The ring 9 is also provided with an ear 16 to which a power rod from a piston and cylinder (see Fig. 1) may be applied for the purpose of imparting rotational movement to the ring 9. As the means for imparting rotational movement to the ring 9 can be of any suitable kind illustration of specific means for that purpose is thought unnecessary since such means are well known.

The ring 9 is also provided with a rack portion 17 and the stationary frame member 1 is provided with a similar rack portion 18 between which a pinion may be placed with suitable provision for rotating the pinion to thereby impart rotation to the ring 9. This being another or auxiliary method of moving the ring. See Figures 8 and 9.

19 is the main wedgeway of the ring 9 which cooperates with the main wedge 25 on the door 20. The door 20 comprises an outer annular wall 21 and an inner annular wall 22 united on the outer side by a suitable web of metal which is bored at intervals at 57 to receive the tread forming pin guide shanks hereinafter again referred to.

The door is provided with carrying lugs 23 carrying replaceable wedges 24 which cooperate with the wedges 13 of the hooks 12 of the clamp ring thereby to hold the door entirely closed when the clamp ring shall have been rotated to bring its wedges into engagement with the wedges of the door.

The door is provided with arms 26 having hinge pin lugs 27 to cooperate with the hinge lugs 7 of the stationary section. The stationary section 1 of the heater is provided with an inner seat 28 for one-half of the removable mold proper. It is also provided with an outer seat 29 for the same purpose. The door 20 is provided with an inner seat 30 and an outer seat 31 for the other half of the removable mold section proper.

The removable mold sections proper (numbered 33 and 43 respectively) are secured to their respective sections of the heater by suitable screws 32, the mold half 33 being secured to the stationary section 1 and the mold half section 43 to the door 20 of the heater. The mold half 33 has an inner seat 34 to match the seat 28 and an outer seat 35 to match the seat 29. The stationary mold half 33 has a plane face 36 located in the central longitudinal plane of the heater unit, the face 36 having countersunk portions 37. The mold section 33 also has an overhung flange 38 and is provided with a tread forming face 39 and a side wall forming face 40 as shown. At the inner portion of the side wall face 40 the mold section 33 is provided with a seat 41 for the bull ring 88.

Adjacent to the tread forming face 39 the mold section 33 is provided with pin end sockets 42 into which the correspondingly shaped points of the tread hole producing pins, hereinafter referred to, are adapted to seat at times. The other section of the mold proper 43 has inner and outer seats 44 and 45 respectively to match the seats 30 and 31 of the door. It is also provided with a central plane face 46 corresponding to the face 36 of the opposed section, the face 46 having a countersunk portion 47 opposing the portion 37 of the other section 33 of the mold and a seat 48 to receive the overhung flange 38.

49 is the tread forming surface of the mold section 34, and 50 is the side wall forming face thereof and 51 is the bull ring seat which corresponds to the bull ring seat 41 of the opposite section.

That section of the mold proper 43 which is mounted on the door has suitably spaced pin bores 52, the ends of which, adjacent the molding cavity, are counterbored at 53 and bushed with suitable bushings 54. The opposite end of each bore 52 is counterbored at 55 and tapped as at 56. The outer vertical wall of the door is bored at 57, the number of bores corresponding to the number of bores 52 and aligning with the same, the bores 57 serve to receive the guide sleeves 58. The guide sleeves 58 each consists of the portion which projects through the bore 57 and an enlarged spacer section 59 which braces and spaces the mold section proper 43 with relation to the door 20. The end of the guide sleeve 58 which is adjacent the mold section 43 is threaded at 60 to enter the threaded portion 56 of the counterbore 55 and become secured to the mold section 43. The other end of the sleeve 58 is threaded at 61 to receive the jam nut 62.

A suitable bushing 63 is inserted into the outer end of each sleeve 58 and bored to permit passage with a neat sliding fit of the tread-hole producing pins 64. Each pin 64 has one end pointed at 65 to fit the recess or socket 42 when brought into relation therewith and each pin 64 has its other end threaded at 66, by means of which it is secured to the annulus 68 of the pin carrying spider 67, suitable jam nuts being employed for the purpose. The pin carrying spider 67 is provided with a piston rod receiving portion 69 and suitable openings 70 through which arms of the guide bracket 85 may project.

71 is a cylinder whose arms 72 are bolted at 73 to the flange ring of the door 20. The cylinder 71 is provided with taps 74 and 75 for the admission and exhaust of the necessary working fluid that gives motion to the piston. (This may be either compressed air, water or steam.) The cylinder is provided with a head 76 and a gland 77 through which the piston rod 79 works, the piston 78 being secured to the rod and located within the cylinder in the usual manner.

The piston rod 79 is threaded at 80 to receive the piston and at 81 it is threaded to screw into the piston rod receiving portion 69 of the spider 67 so that the spider and piston rod will move in unison. The piston rod 79 also has a guide portion 82 that slidably passes through a guide bearing 86 in the guide bracket 85, the outer end of the guide portion 82 of the piston rod 79 being threaded at 83 to receive a stop flange and nut 84. The guide bracket 85 has its arms bolted at 87 to the door as will be clear from the drawings.

The bull ring 88 has seats 89 to cooperate with the seats 41 and 51 and it is also provided with lugs 90 through which and through lugs 91 on the stationary section 1 of the heater, bolts 92 are passed to secure the bull ring to the stationary section of the heater.

So far as described the manner in which my invention operates is as follows: After the tire carcass has been built up and supplied with the requisites of tread rubber, an air bag is placed within the carcass and the carcass and air bag placed within the heater, it being, of course, understood that the clamp ring is first rotated to unlock the door and the door is swung open. After having placed the tire in the mold section 33 the door is closed, it being understood that at this time the pins have been withdrawn from the molding cavity. Suitable air pressure is introduced into the air bag and after the tire has been in the mold a short time (sufficient to soften the rubber) the piston in the cylinder is impelled in a direction to cause the pins to penetrate the tread portion of the tire. The parts are then left in this position until a proper cure of the tire has been effected. After the tire has been in the mold a sufficient time to become cured properly the motion of the pins is reversed and the pins withdrawn, after which the mold is unlocked and the door opened. The tire can then be readily removed from the mold and the operations repeated on another tire.

It should be understood that various changes and modifications in the details of construction, form and design of parts, can be made without departing from the spirit of the invention or the scope of the appended claims.

What I claim is:

1. In a tire mold having a molding cavity, and apertures for the passage of core pins into and from the molding cavity and core pins cooperating with said apertures; means for advancing and retracting the core pins into and from the molding cavity, said means comprising a spider to which said pins are attached, a cylinder with piston and piston rod mounted on the mold, said piston rod being connected to said spider whereby upon movement of the piston in one direction or the other the pins will be correspondingly moved.

2. In tire molds of the sectional type having molding cavities, one of the sections having apertures to permit passage of core pins into the mold cavities and a member to which said pins are secured; means for moving said member to advance and retract the pins, said moving means comprising a cylinder and piston with piston rod mounted on the mold with the axis of the piston rod paralleling the axis of the mold, said piston rod being connected to said member which carries the pins and means for admitting motive fluid into the cylinder to impart motion to the piston.

3. In tire molds of the sectional type having molding cavities, one of the sections having apertures to permit passage of core pins into the molding cavities and a member to which said pins are secured; means for moving said member to advance and retract the pins, said moving means comprising a cylinder and piston with piston rod mounted on the mold with the axis of the piston rod paralleling the axis of the mold, said piston rod being connected to said member which carries the pins and means for admitting motive fluid into the cylinder to impart motion to the piston, a yoke carried by a mold section and having bearing for said piston rod.

4. In heaters of the watch-case type wherein is provided a relatively stationary member and a door member hinged thereto; a mold proper mounted within said members, said mold proper consisting of a relatively stationary section and a relatively movable section, core pin guides associated with said relatively movable section of the mold proper and with the door, core pins operable in said guides and adapted to be projected through the mold chamber, a cylinder mounted on said door, a piston and piston rod carried by the cylinder, a spider carried by the piston rod and having an annulus to which said pins are secured and means for admitting motive fluid to and exhausting motive fluid from said cylinder to operate said piston and thereby move said pins accordingly.

5. In heaters of the watch-case type wherein is provided a relatively stationary member and a door member hinged thereto; a mold proper mounted within said members, said mold proper consisting of a relatively stationary section and a relatively movable section, core pin guides associated with said relatively movable section of the mold proper and with the door, core pins operable in said guides and adapted to be projected through the mold chamber, a cylinder mounted on said door, a piston and piston rod carried by the cylinder, a spider carried by the piston rod and having an annulus to which said pins are secured and means for admitting motive fluid to and exhausting motive fluid from said cylinder to operate said piston and thereby move said pins accordingly, and a yoke member secured to said door and having a bearing for said piston rod.

6. In watch-case heaters, a relatively stationary section and a door hinged thereto, a mold proper consisting of a relatively stationary section secured to the relatively stationary section of the heater and a relatively movable section secured to the door, said sections of the mold proper enclosing, when brought together, the mold chamber for the reception of the tire, core pin guides mounted on the door and the relatively movable mold section, core pins operable in said guides and adapted to be projected into and through the mold chamber, a cylinder secured to the door with its axis paralleling the axis of the heater, a piston in said cylinder, a piston rod carried by the piston, a spider having openings and secured to said piston rod, said spider having an annulus to which said pins are secured, a yoke passing through the openings of said spider and secured to said door and having a bearing for said piston rod.

7. In combination with a tire mold having a molding cavity, of a pin carrying member, core pins carried by said member, said mold having apertures for the passage of said pins into and from the molding cavity, and cylinder and piston mechanism including a piston rod directly connected to said pin carrying member, the axis of said piston rod paralleling the axis of the mold, whereby when said piston is impelled in one direction the pins will be advanced and when said piston is impelled in the opposite direction said pins will be retracted, and means for admitting motive fluid into and exhausting the same from said cylinder.

8. The combination of a tire mold having an annular molding cavity, of a pin carrying member, core pins carried by said member, said mold having apertures for the passage of said pins into and from the mold cavity, mechanism mounted on said mold along the axial line thereof and connected to said pin carrying member for moving the same in the direction of the axis of the mold to advance and retract said pins, said moving means comprising a cylinder with piston and piston rod mounted on said mold with the piston rod lying parallel to the axis of the mold for the purposes specified.

9. In vulcanizing molds, a heater comprising a relatively stationary part and a relatively movable part separable from the stationary part, means for locking said parts together, a mold proper consisting of two sections, one mounted in the movable part and one in the stationary part of the heater, said mold proper enclosing a molding chamber adapted to receive the tire to be vulcanized, pins carried by said heater, said mold proper having apertures to permit passage of said pins into the molding chamber, a cylinder and piston device carried by one of the parts of said heater, said piston and cylinder device including a piston rod, a spider connected to said piston rod and having a portion to which said pins are secured, whereby upon movement of the piston rod the pins will be advanced or withdrawn accordingly as the piston rod moves in one direction or the other, and means for supplying motive fluid to said cylinder and piston device.

10. In vulcanizing molds of the watch-case heater type wherein is provided a relatively stationary heater section and a door section hinged thereto and means for securing the door closed; a removable vulcanizing mold proper carried within the heater and comprising a relatively stationary half and a relatively movable half, the former being secured to the stationary part of the heater and the latter being secured to the door, said mold proper having core pin apertures, core pin guides secured to the door and the corresponding half of the mold proper, each of said guides including a tubular portion having a bearing bushing for the core pins, a second bearing bushing for each core pin being carried by the half of the mold proper which is attached to the door, a spider having an annulus to which said core pins are secured, a piston and cylinder device including a piston rod, mounted on the door with the piston rod lying coincident with the axis of the heater, said piston rod being secured to said spider substantially as shown and described.

11. In vulcanizing molds of the watch-case heater type wherein is provided a relatively stationary heater section and a door section hinged thereto and means for securing the door closed; a removable vulcanizing mold proper carried within the heater and comprising a relatively stationary half and a relatively movable half, the former being secured to the stationary part of the heater and the latter being secured to the door, said mold proper having core pin apertures, core pin guides secured to the door and the corresponding half of the mold proper, each of said guides including a tubular portion having a bearing bushing for the core pins, a second bearing bushing for each core pin being carried by the half of the mold proper which is attached to the door, a spider having an annulus to which said core pins are secured, a piston and cylinder device including a piston rod, mounted on the door with the piston rod lying coincident with the axis of the heater, said piston rod being secured to said spider, said spider having openings, a yoke having a bearing located outside of the spider and having arms projecting through the spider openings and secured to said door, said yoke bearing adapted to receive said piston rod.

12. In vulcanizing molds of the watch-case heater type wherein is provided a relatively stationary heater section and a door section hinged thereto and means for securing the door closed; a removable vulcanizing mold proper carried within the heater and comprising a relatively stationary half and a relatively movable half, the former being secured to the stationary part of the heater and the latter being secured to the door, said mold proper having core pin apertures, core pin guides secured to the door and the corresponding half of the mold proper, each of said guides including a tubular portion having a bearing bushing for the core pins, a second bearing bushing for each core pin being carried by the half of the mold proper which is attached to the door, a spider having an annulus to which said core pins are secured, a piston and cylinder device including a piston rod, mounted on the door with the piston rod lying coincident with the axis of the heater, said piston rod being secured to said spider, said spider having openings, a yoke having a bearing located outside of the spider and having arms projecting through the spider openings and secured to said door, said yoke bearing adapted to receive said piston rod, and an adjusting device on said piston rod for limiting the stroke thereof.

JAMES W. BRUNDAGE.